United States Patent Office 3,257,390
Patented June 21, 1966

3,257,390
RING A UNSATURATED 21-HYDROXY-3-OXO-17α-PREGNANE-17-CARBOXYLIC ACID LACTONE DIURETIC AGENTS
Arthur A. Patchett, Metuchen, N.J., assignor to Merck & Co., Inc., Rahway, N.J., a corporation of New Jersey
No Drawing. Filed June 12, 1963, Ser. No. 287,197
15 Claims. (Cl. 260—239.55)

This invention is concerned with new and useful aldosterone antagonists. More particularly, it is concerned with steroid compounds useful as diuretic agents, with methods for their preparation and with the intermediates produced.

The aldosterone antagonists of this invention are 7α-acylthio - 21 - hydroxy-3-oxo-17α-pregn-4-ene-17-carboxylic acid lactones and 21-hydroxy-3-oxo-17α-pregna-1,4-diene-17-carboxylic acid lactone. They may be represented by the following formulas:

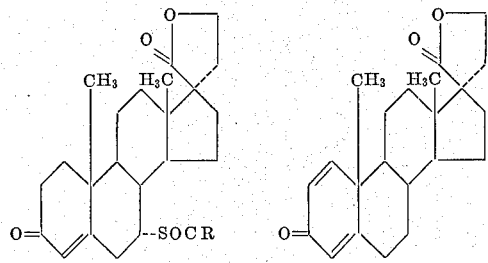

wherein R is a lower alkyl group such as methyl, ethyl, propyl, butyl and the like. This application is a continuation-in-part of copending Serial No. 184,674, filed April 3, 1962, now Patent No. 3,103,510, issued September 10, 1963.

The starting compound used in the novel process of this invention is 3β-hydroxy-androsta-5,16-diene-17-carbonitrile. The hydroxyl group at the 3-position is first blocked for example by substitution of the hydrogen atom with a readily removal group which is, however, sufficiently stable so that the hereinafter described reactions at the 17-position can be effected. Preferably, the hydroxyl group is protected by conversion to an ether. The preferred class of ethers is one which is stabilized by the presence of an electron rich oxygen atom adjacent the carbon atom involved in the ether linkage. Of these the tetrahydropyranyl ether formed by reaction between the steroid substrate and dihydropyran as the etherifying agent under acid catalysis is the most preferred.

The ether, e.g. 3β-[(tetrahydropyran-2-yl)-oxy]androsta-5,16-diene-17-carbonitrile is next converted to 3β,21-dihydroxy - 17α - pregna - 5,15-diene-17-carboxylic acid γ-lactone and then to a 3-acylate thereof. The compounds may be represented by the following formula wherein $R_1$ is hydrogen or an acyl group such as acetyl, propionyl, butyryl or valeryl.

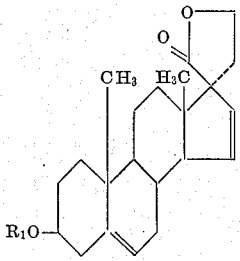

The conversion is effected by first substituting an etherified hydroxyethyl group such as the tetrahydropyranyl-oxyethyl group at the 17α-position and thereafter hydrolyzing the ether groups and the cyano group to produce the 3β-ol-γ-lactone which is finally acylated.

Bromoethanol tetrahydropyranyl ether or the corresponding iodo compound which may be utilized in this series of reactions are prepared by reaction of the dihydropyran with the appropriate haloethanol in accordance with the procedure described above for the preparation of the 3-tetrahydropyranyl ether.

The preferred method of etherification with a haloethanol tetrahydropyranyl ether is by separate additions of the steroid and the ether in tetrahydrofuran to potassium amide or other alkali metal amide in liquid ammonia in a dry reaction vessel equipped with a Dry Ice condenser and a stirrer. When reaction is complete, the ammonia is removed by distillation. The 3β,21-bis-[(tetrahydropyran - 2 - yl) - oxy]-17α-pregna-5,15-diene-17-carbonitrile thus produced is then subjected to alternate alkaline and acid hydrolysis to produce 3β,21-dihydroxy-17α-pregna-5,15-diene-17-carboxylic acid which lactonizes to the corresponding γ-lactone. For the alkaline hydrolysis the mixture is preferably refluxed for a long period, e.g. 15 to 20 hours with an excess of dilute aqueous base such as potassium hydroxide in an alkanol such as propanol. After removing approximately two-thirds of the alkanol, dilute mineral acid, e.g. 2.5 N hydrochloric acid is added in sufficient quantity to make the mixture strongly acid. It is thereafter refluxed for one-half to two hours to produce the desired lactone.

The lactone is then acylated. For example, it may be acetylated simply by standing in a 1:1 mixture of pyridine and acetic anhydride at 20° to 30° for from 10 to 20 hours. Other acylated derivatives may be similarly prepared by reaction with the appropriate anhydride or acid halide.

The 15-double bond is next selectively reduced by catalytic hydrogenation. An effective procedure utilizes hydrogen and a noble metal catalyst such as palladium on charcoal in a suitable solvent such as acetic acid or other lower alkanol acid. The novel 3β,21-dihydroxy-17α-pregn-5-ene-17-carboxylic acid γ-lactones produced by this reaction may be represented by the following formula in which $R_1$ has the same meaning as above:

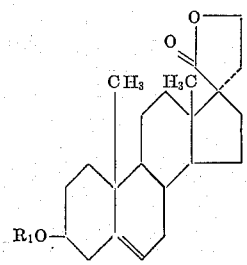

Hydrolysis of the acylate group for example by weak base produces the new compounds 2β,21-dihydroxy-17α-pregn-5-ene-17-carboxylic acid γ-lactone represented by the following formula:

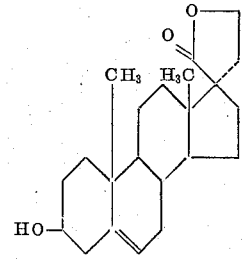

A suitable hydrolysis procedure is to dissolve the substrate in a lower alkanol such as methanol, add dilute aqueous base and either allow the mixture to stand for several hours, e.g. 16 hours or heat for a shorter period of time. The aqueous base is preferably a 2–3% solution of potassium bicarbonate but other alkali or alkaline earth metal bases may be employed.

Oxidation of the hydrolyzed compound produces the novel 21 - hydroxy - 3-oxo-17α-pregn-4-ene-17-carboxylic acid γ-lactone which is represented by the following formula:

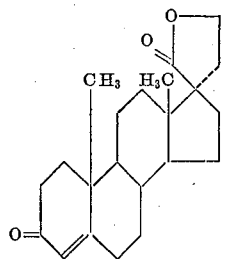

Oxidation is effected by reaction with an oxidizing agent such as chromium trioxide and sulfuric acid or if desired with a ketone such as cyclohexanone in the presence of a catalytic amount of an aluminum alkoxide such as aluminum isopropoxide or t-butoxide. This latter reaction is preferably carried out by heating the reactants in a solvent which may be excess ketone but is preferably an aromatic hydrocarbon solvent such as benzene or toluene. It is preferred to utilize an inert atmosphere such as a nitrogen to minimize side reactions, but it is not essential.

The novel compound 21-hydroxy-3-oxo-17α-pregna-4,6-diene-17-carboxylic acid γ-lactone is prepared by dehydrogenation of the corresponding pregn-4-ene with a 6,7-dehydrogenating quinone such as chloranil. Reaction is generally effected by heating the substrate under reflux with the quinone in an inert organic solvent such as an ester or an alcohol. The presence of a small amount of a lower alkanoic acid such as acetic acid often aids the reaction. The use of an inert atmosphere aids in minimizing side reaction, but is not essential.

The compound 21 - hydroxy - 3 - oxo-17α-pregna-1,4-diene-17-carboxylic acid γ-lactone is obtained by dehydrogenation of the corresponding pregn-4-ene prepared as described above with a 1,2-dehydrogenating agent such as selenium dioxide. The substrate may for example be heated under reflux in a high boiling inert organic solvent such as esters, alcohols or hydrocarbons. Catalytic amounts of mercury or a lower alkanoic acid such as acetic acid aid in effecting reaction, but are not essential.

Substitution of a thioacyl group at the 7-position of the 6,7-dehydro compound prepared as described above takes place by reacting the steroid substrate with a lower alkane thiolic acid with or without an inert organic solvent.

The compounds of this invention are aldosterone antagonists useful in the treatment of edema. When used as diuretics, the compounds of this invention are administered in dosages of approximately the same order of magnitude as other steroid agents often recommended for these purposes such as spironolactone. They may be used in combination with other diuretics such as thiazides and mercurials with beneficial results.

The biologically active compounds of this invention may be administered alone or in combination with pharmaceutically acceptable carriers. The choice of carriers is determined by the route of administration and standard pharmaceutical practice. For oral administration, the compounds may be administered in the form of tablets containing excipients such as starch or milk sugar. Aqueous solutions and elixirs which may be sweetened or flavored may also be employed. For parenteral use isotonic mixtures may be employed.

The following examples are given solely for the purpose of illustration and are not to be construed as limitations of this invention many apparent variations of which are possible without departing from the spirit or scope thereof.

EXAMPLE I. — 3β-[(TETRAHYDROPYRAN-2-YL)-OXY] - ANDROSTA - 5,16 - DIENE - 17-CARBONITRILE

Nine hundred milligrams of 3-hydroxy-androsta-5,16-diene-17-carbonitrile are dissolved in 30 ml. of benzene and evaporated to dryness in vacuo.

The residue is dissolved in 20 ml. of dihydropyran (freshly distilled from sodium) and 200 mg. of p-toluenesulfonyl chloride added. The mixture is allowed to stand for 10 hours at 20–30° C. and diluted with a copious quantity of ether, washed with a 5% solution of sodium bicarbonate, dried, and evaporated to dryness in vacuo. The residue is dissolved in a small amount of benzene and chromatographed on 40 g. of basic alumina. Elution of the column with petroleum ether-ether 8:2 and removal of the solvent results in 1 g. of the desired product.

Similar results are obtained with other etherifying agents and with the same etherifying agent using other acid catalysts such as 2,4-dinitrobenzenesulfonyl chloride during reaction periods of from eight to twenty hours.

EXAMPLE II.—BROMOETHANOL TETRAHYDROPYRANYL ETHER

To a cooled, stirred solution of 8.4 g. of dihydropyran and ca. 10 mg. of p-toluenesulfonyl chloride 12.5 g. of bromoethanol is added dropwise. The mixture is stirred for five minutes at 0° and stirring is then continued at room temperature for 2 hours.

One gram of finely powdered potassium carbonate is then added and the reaction mixture distilled. A yield of 10.88 g. of bromoethanol tetrahydropyranyl ether boiling at 72–73°/2.5 mm. is obtained.

This compound decomposes slowly even in the presence of potassium carbonate. It is therefore expedient to use freshly prepared or redistilled material.

The corresponding iodoethanol tetrahydropyranyl ether is similarly prepared.

EXAMPLE III.—3β,21-DIHYDROXY - 17α - PREGNA-5,15-DIENE-17-CARBOXYLIC ACID γ-LACTONE 3-ACETATE

One hundred milliliters of liquid ammonia is distilled into a dry 500 ml. flask. Three grams of metallic potassium is added portionwise following the addition of a crystal of ferric chloride and the mixture stirred at room temperature until the blue color disappears. 3β-hydroxy-androsta-5,16-diene-17-carbonitrile (3 g.) is dissolved in 75 ml. of tetrahydrofuran (distilled from LiAlH₄) and added to the reaction mixture. Bromoethanol tetrahydropyranyl ether (12.75 ml.) in 45 ml. of tetrahydrofuran is slowly added. After stirring at room temperature for two hours, the ammonia is evaporated. Three hundred-fifty mililiters of propanol containing 35 g. of potassium hydroxide is added and the tetrahydrofuran distilled off. The reaction mixture is heated under reflux for 18 hours, two-thirds of the propanol distilled off in vacuo and 2.5 N hydrochloric acid added until the reaction is strongly acidic to pH paper. It is then heated under reflux for one hour, concentrated in vacuo, extracted with ethyl acetate, washed with water, dried and concentrated to a light brown oil containing 3β,21-dihydroxy-17α-pregna-5,15-diene-17-carboxylic acid γ-lactone. Acetylation of this oil with 10 ml. of pyridine and 10 ml. of acetic anhydride at room temperature overnight gives dark brown crystals which are chromatographed on 100 g. of acid washed alumina. Elution of the column with petroleum ether-ether 2:3 and 1:4 yields after recrystallization from methylene chloride-ether (a trace of methanol was used to effect solution) the desired product, M.P. 228–232° C.

Various other acylates such as the propionyl, butyryl and valeryl derivatives are similarly prepared using the appropriate acylating agents. Other haloethanol ethers such as iodoethanol tetrahydropyranyl ether are utilized using alkali metal amides such as sodium amide to produce the intermediate diethers.

EXAMPLE IV.—3β,21-DIHYDROXY - 17α - PREGN-5-ENE - 17 - CARBOXYLIC ACID γ - LACTONE 3-ACETATE

Eight hundred milligrams of 3β,21-dihydroxy-17α-pregna-5,15-diene-17-carboxylic acid γ-lactone 3-acetate is combined with 200 mg. of 5% palladium on charcoal in 240 ml. of glacial acetic acid and hydrogenated at atmospheric pressure for 16 hours. After filtering from the catalyst, the glacial acetic acid is removed and the desired product recovered.

Other esters of this compound such as the 3-propionate, 3-butyrate and 3-valerate are similarly prepared by hydrogenation at 20° C. to 30° C. at approximately atmospheric pressure in a lower alkanoic acid for a period of from twelve to twenty hours.

EXAMPLE V.—3β,21-DIHYDROXY-17α-PREGN-5-ENE-17-CARBOXYLIC ACID γ-LACTONE

Eight hundred milligrams of the hydrogenation product of the previous example is dissolved in 500 ml. of methanol and heated under reflux with 2 g. of potassium bicarbonate in 60 ml. of water for 4 hours. It is cooled, acidified with 2.5 N hydrochloric acid and concentrated in vacuo. The residue is extracted with ethyl acetate, the organic solution washed with water, 2.5% solution of sodium bicarbonate and again water to yield the desired product after drying and evaporation of the solvent.

Other esters such as the 3-propionate, 3-butyrate and 3-valerate are similarly hydrolyzed with alkali and alkaline earth metal bases to produce the same product.

EXAMPLE VI.—21-HYDROXY-3-OXO-17α-PREGN-4-ENE-17-CARBOXYLIC ACID γ-LACTONE

Seven hundred milligrams of the product prepared in the previous example is dissolved in 300 ml. of benzene and 8 ml. of cyclohexanone. The benzene is distilled through the reflux condenser until 60 ml. are collected. The flask is cooled and 4.5 ml. of a 10% aluminum isopropoxide solution added. The reaction is heated under reflux in a nitrogen atmosphere for 4 hours. Dilute hydrochloric acid is added and the mixture extracted with ethyl acetate. The organic layer is washed with water, dried, evaporated to dryness at 110° C. and 2.5 mm. to ensure removal of most of the cyclohexanone. Chromatography of the residual oily crystals on 50 g. of acid washed alumina yields after elution of the column with ether-chloroform 7:3 and subsequent recrystallization from methylene chloride-ether 342 mg. of the desired product, M.P. 205–210° C.

The reaction is similarly carried out with other inert organic solvents or using excess ketone as the solvent at reaction temperatures of from 75° to 125° C. for from three to seven hours.

The same product is obtained by oxidation of the substrate with chromium trioxide and sulfuric acid in acetone.

EXAMPLE VII.—21 - HYDROXY - 3 - OXO - 17α-PREGNA-4,6-DIENE-17-CARBOXYLIC ACID γ-LACTONE

Chloranil (600 mg.) is added to 300 mg. of the product of Example VI dissolved in 18 ml. of propyl acetate containing 3.6 ml. of glacial acetic acid. The reaction mixture is heated under reflux for 18 hours in a nitrogen atmosphere. After cooling, it is diluted with ethyl acetate, washed with water, dried, evaporated to dryness, taken up in ether and chromatographed on 15 g. of acid washed alumina and the product recovered by elution of the column with ether and ether-chloroform 3:2.

The reaction is similarly carried out using 2,6-dichloro-1,4-benzoquinone, 1,4-benzoquinone and other 6,7-dehydrogenating agents in inert organic solvents such as ethyl acetate, t-butanol and amyl alcohol at temperatures of from 70° to 90° C. for from three to eighteen hours.

EXAMPLE VIII.—21 - HYDROXY - 3 - OXO - 17α-PREGNA-1,4-DIENE-17-CARBOXYLIC ACID γ-LACTONE

To 200 mg. of the product prepared in Example VI in 8 ml. of amyl alcohol containing 0.1 ml. of acetic acid and 0.02 ml. of mercury there is added 264 mg. of selenium dioxide in 5 ml. of amyl alcohol. The reaction mixture is heated under reflux for 50 hours and filtered through Super-cel. After evaporation to dryness, the residue is dissolved in a small amount of benzene and chromatographed on 5 g. acid washed alumina. Elution of the column with ether-chloroform 2:3 gives the desired product which is purified by several recrystallizations from acetone-ether.

The same product is obtained using other inert organic solvents such as t-butanol at temperatures from 75° to 200° C. for from forty to sixty hours.

EXAMPLE IX. — 7α-ACYLTHIO-21-HYDROXY-3-OXO-17α-PREGN-4-ENE-17-CARBOXYLIC ACID γ-LACTONE

One hundred milligrams of the product prepared in Example VIII is refluxed with 5 ml. of ethanethiolic acid for 1 hour. After dilution with ethylacetate, the organic layer is washed with a 5% solution of sodium bicarbonate and water, dried and evaporated in vacuo. Trituration of the remaining oil with ether results in 78 mg. of the desired product.

Other thioacyl compounds such as the thiopropionyl, thiobutyryl and thiovaleryl derivatives are similarly prepared by heating the substrate with the appropriate alkane thiolic acid at from 90° to 120° C. for from one-half to three hours.

Various changes and modifications may be made in carrying out the present invention without departing from the spirit and scope thereof. Insofar as these changes and modifications are within the purview of the annexed claims, they are to be considered as part of our invention.

What is claimed is:

1. A process which comprises reacting 21-hydroxy-3-oxo-17α-pregna-4,6-diene-17-carboxylic acid γ-lactone with an alkane thiolic acid to produce a 7α-acylthio-21-hydroxy-3-oxo-17α-pregn - 4 - ene-17-carboxylic acid γ-lactone.

2. A process which comprises selectively reducing a 3β,21-dihydroxy-17α-pregna-5,15-diene-17-carboxylic acid γ-lactone 3-acylate with palladium on carbon in a lower alkanoic acid to produce a 3β,21-dihydroxy-17α-pregn-5-ene-17-carboxylic acid γ-lactone 3-acylate.

3. A process which comprises reacting 21-hydroxy-3-oxo-17α-pregna-4,6-diene-17-carboxylic acid γ-lactone with ethane thiolic acid to produce 7α-acetylthio-21-hydroxy-3-oxo-17α-pregn-4-ene-17-carboxylic acid γ-lactone.

4. 3β-[tetrahydropyran-2 - yl) - oxyl] - androsta - 5,16-diene-17-carbonitrile.

5. A compound selected from the group which consists of 3β,21-dihydroxy-17α-pregna-5,15-diene - 17 - carboxylic acid γ-lactone and the 3-lower hydrocarbon carboxylic acylates thereof.

6. 3β,21-dihydroxy-17a-pregna-5,15-diene - 17 - carboxylic acid γ-lactone.

7. 3β,21-dihydroxy-17α-pregna-5,15-diene - 17 - carboxylic acid γ-lactone 3-acetate.

8. A compound selected from the group which consists of 3β,21-dihydroxy-17α-pregn-5-ene-17-carboxylic acid γ-lactone and the 3-lower hydrocarbon carboxylic acylates thereof.

9. 3β,21-dihydroxy-17α-pregn-5-ene-17-carboxylic acid γ-lactone.

10. 3β,21-dihydroxy-17α-pregn-5-ene-17-carboxylic acid γ-lactone 3-acetate.

11. 21-hydroxy-3-oxo-17α-pregn-4-ene-17-carboxylic acid γ-lactone.

12. 21-hydroxy-3-oxo-17α-pregna-4,6-diene-17-carboxylic acid γ-lactone.

13. 21-hydroxy-3-oxo-17α-pregna-1,4-diene-17-carboxylic acid γ-lactone.

14. 7α-acylthio-21-hydroxy-3-oxo-17α-pregn-4-ene-17-carboxylic acid γ-lactones.

15. 7α-acetylthio-21-hydroxy-3-oxo-17α-pregn-4-ene-17-carboxylic acid γ-lactone.

References Cited by the Examiner
UNITED STATES PATENTS

| | | | |
|---|---|---|---|
| 3,013,012 | 12/1961 | Cella et al. | 260—239.57 |
| 3,043,835 | 7/1962 | Brown | 260—239.57 |
| 3,071,582 | 1/1963 | Zderic et al. | 260—239.57 |
| 3,103,510 | 9/1963 | Patchett | 260—239.57 |

LEWIS GOTTS, *Primary Examiner.*

ELBERT L. ROBERTS, *Assistant Examiner.*